April 1, 1952 H. S. YOUNG 2,591,036

BLOCK INDICATOR FOR CENTRALIZED TRAFFIC CONTROL SYSTEMS

Filed Sept. 24, 1947 3 Sheets-Sheet 1

INVENTOR.
Henry S. Young
BY
[signature]
HIS ATTORNEY

BLOCK INDICATOR FOR CENTRALIZED TRAFFIC CONTROL SYSTEMS

Filed Sept. 24, 1947

3 Sheets-Sheet 2

INVENTOR.
Henry S. Young
BY
HIS ATTORNEY

BLOCK INDICATOR FOR CENTRALIZED TRAFFIC CONTROL SYSTEMS

Filed Sept. 24, 1947

3 Sheets-Sheet 3

INVENTOR.
Henry S. Young
BY
HIS ATTORNEY

Patented Apr. 1, 1952 2,591,036

UNITED STATES PATENT OFFICE 2,591,036

BLOCK INDICATOR FOR CENTRALIZED TRAFFIC CONTROL SYSTEMS

Henry S. Young, Wilkinsburg, Pa., assignor to Westinghouse Air Brake Company, a corporation of Pennsylvania Application September 24, 1947, Serial No. 775,843

3 Claims. (Cl. 246—3)

Figure 1A:
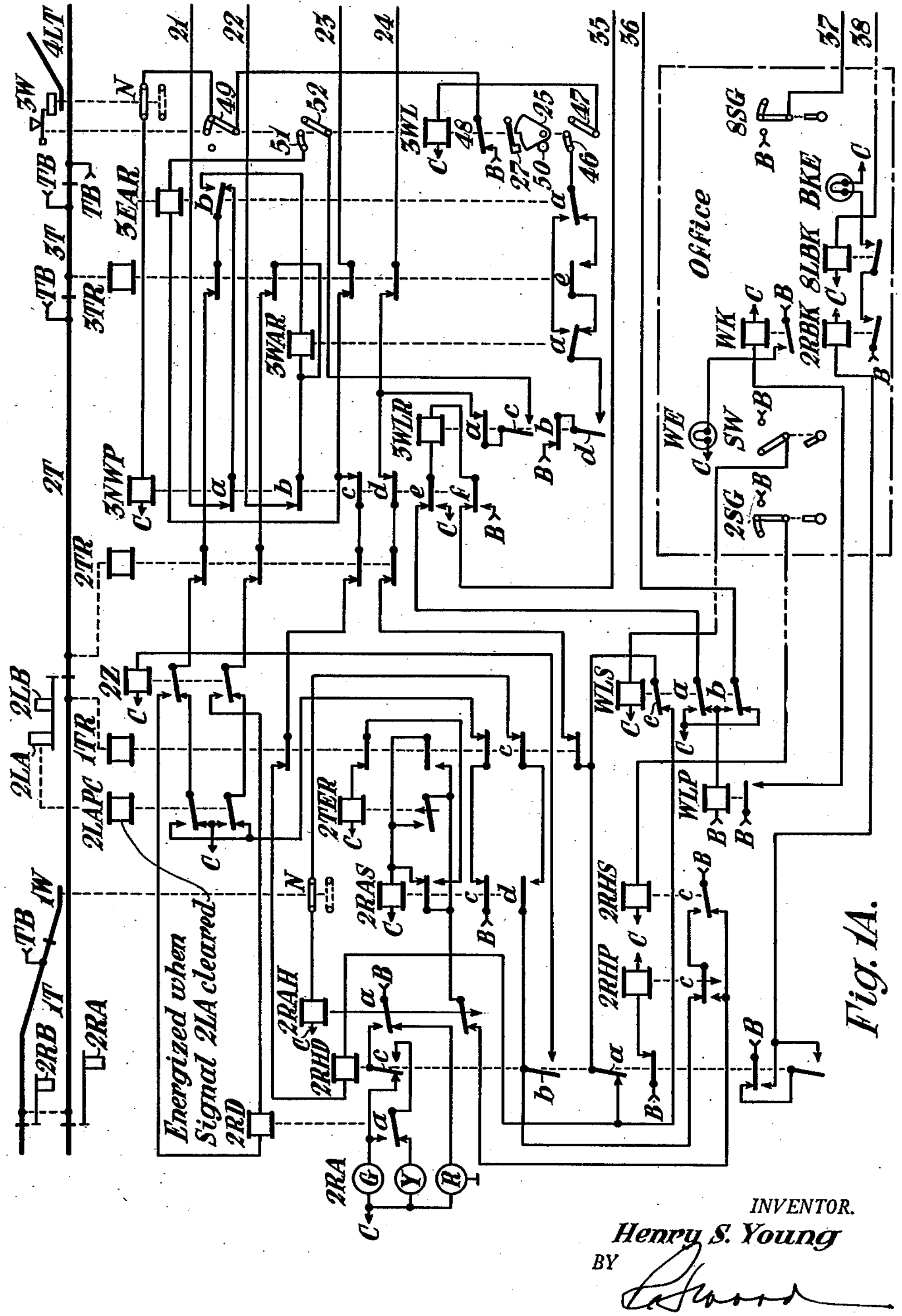

My invention relates to centralized traffic control systems for single track railroads of the type in which each block is provided with a system of normally energized line circuits for each direction for governing the signals in accordance with traffic conditions. More particularly, my invention relates to the provision of block indication means controlled by the line circuits of such systems in such a manner as to indicate to the central office operator whether or not any portion of the block is occupied.

In systems of this character the signals conventionally are of the three position type governed by line current of normal polarity to indicate proceed when two or more block sections in advance are unoccupied, by current of reverse polarity to indicate caution when a train governed by the signal vacates the first block section in advance thereof, and each signal is deenergized to indicate stop as long as a train governed thereby occupies the first section in advance or when an opposing train occupies any section of the block in advance thereof, and also when an opposing signal has been cleared. When the block is unoccupied, the signal relays for the successive signals are energized in cascade, each supplying current of normal polarity to the line circuit for the section in the rear. The current of reverse polarity is supplied to the line circuit for the section in the rear of an occupied section of the block by a directional stick relay, and the line relay responsive thereto supplies current of normal polarity to the line circuit for the next following section in the rear, in the event the block embraces three sections or more. It will be clear that in the conventional system the display of a proceed indication by an entering signal indicates that the first and second block section in advance of the signal are unoccupied, but gives no information as to the condition of block sections further in advance with respect to train movements in the direction controlled by the entering signal, and that an additional control condition is needed in order to properly indicate that the entire block is vacant, or conversely, to indicate block occupancy.

In accordance with the present invention the line circuits are arranged to supply current of normal polarity to the line relays for controlling the proceed indication of the entering signals only when the entire block is vacant, thereby rendering these relays capable of properly controlling a block indicator at the office. Under the condition permitting the entering signal to indicate proceed to admit a following train to an occupied block, the required control for the proceed indication of the entering signal is transmitted over the line circuit for the opposing signals, this circuit being available at the time, because its normal source of supply is disconnected whenever the entering signal at the same end of the block is to be cleared in order to hold the opposing signals at stop.

The circuits of my invention include the provision of means for the control of electric switch locks for safeguarding the operation of outlying hand throw switches in a system of the type herein described.

One form of apparatus embodying my invention will now be described, and the novel features thereof will then be pointed out in claims.

Figure 1B:
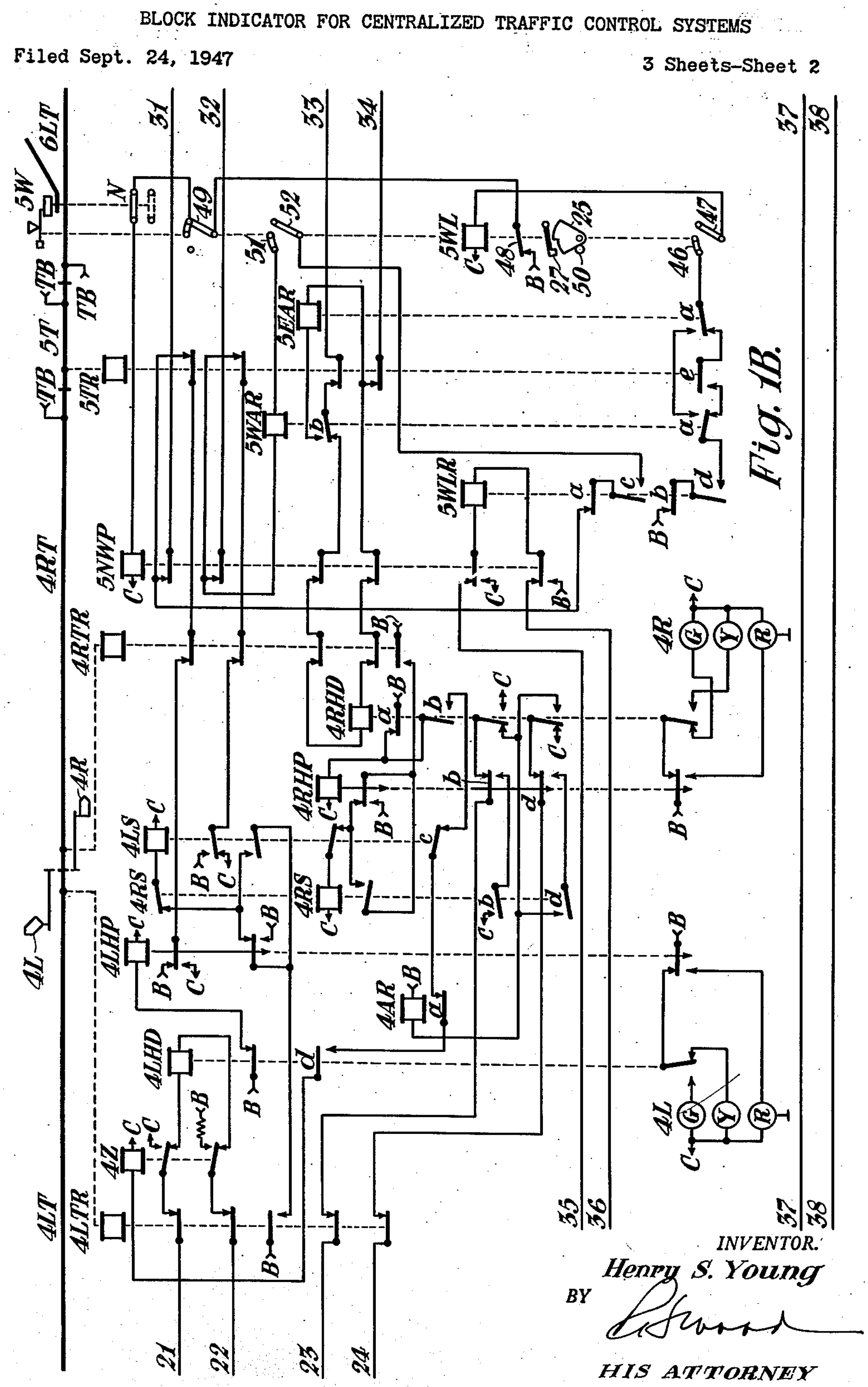
Figure 1C:
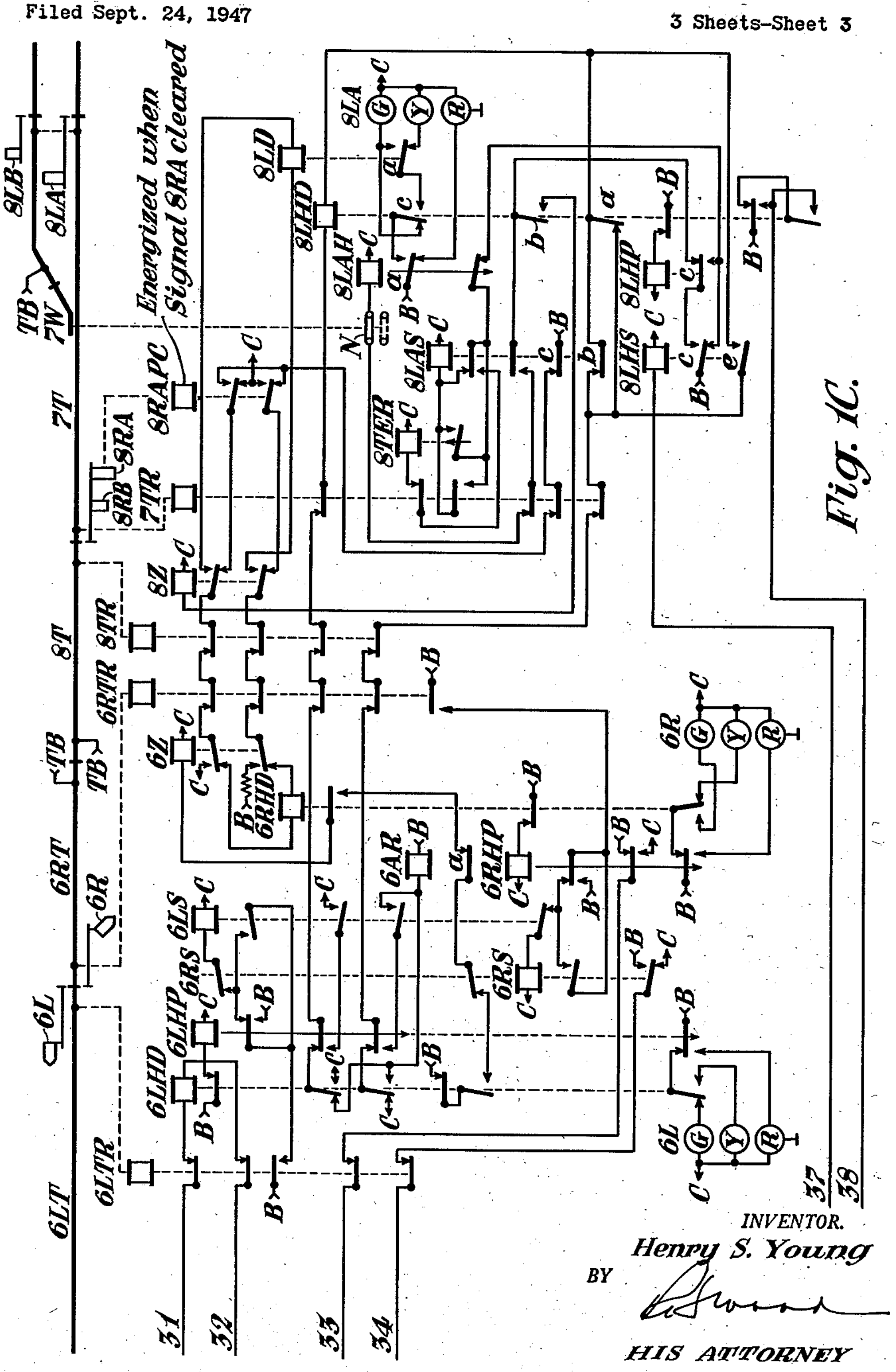

In the accompanying drawings, Figs. 1A, 1B and 1C, taken together, show at the top a track plan for a typical single track block over which traffic movements are governed by the opposing entering signals 2RA or 2RB, and 8LA or 8LB, and by the intermediate signals 4L, 4R, 6L, and 6R. The tracks are divided into sections of suitable lengths by the usual insulated joints, each section being provided with a track circuit identified by the reference character T with distinguishing numerical prefix. Each track circuit is provided with the usual track battery TB for supplying energy to a track relay TR over the rails of its section by means of which the line circuits for the signals are controlled in accordance with traffic conditions.

Similar reference characters refer to similar parts in each of the views, and to simplify the circuits only the terminals for the sources of energy for the system are shown, the positive or supply terminal being identified by the reference character B and the negative or return terminal by the reference character C in each instance.

The single track block is for simplicity shown as embracing but three block sections, but it will be clear that the invention is readily applicable to blocks having more than three sections by the provision of apparatus similar to that shown herein for the additional sections. The line circuits as shown are connected in cascade and include front contacts of the track relays, the circuits which govern traffic movements from right to left comprising those for the line relays 4LHD, 6LHD, and 8LHD, including the line wires 21, 22, 31 and 32, while those for the left to right direction comprise the similar circuits for the line relays 2RHD, 4RHD, and 6RHD, which include the line wires 23, 24, 33 and 34. The line circuit for relay 2RHD includes an approach relay 4AR in series therewith, at the battery end, and the line circuit for relay 8LHD similarly includes a series approach relay 6AR, for purposes hereinafter pointed out. These line circuits differ from those used generally heretofore in that the circuits for relays 2RHD and 8LHD each include polar contacts of the line relay for the next section in advance so that the relay for the third section is energized in the normal direction only when all three block sections are unoccupied, and further, in the provision of a normally deenergized line relay such as relay 2RD or 8LD, a circuit for which is prepared by the relays 2Z and 4Z, or by relays 6Z and 8Z when the corresponding entering signal is cleared by manual control. The circuits also include other minor modifications relating to the control of electric locks for outlying hand throw switches as illustrated by the circuits for switches 3W and 5W.

The manual control of traffic direction and the clearing of the entering signals is effected by the operation of signal levers 2SG and 8SG located at a control office and shown at the lower right in Fig. 1A. It is to be understood that in practice, these controls are effected and the condition of the apparatus is indicated at the control office by a suitable communication system, usually of the code type such as shown in the United States Letters Patent No. 2,229,249, issued January 21, 1941, to L. V. Lewis for Remote Control Systems. For simplicity the various intermittently available control and indication channels provided by the code system are illustrated herein as direct wire connections so that their operation may be more readily traced. That is, the relays 2RHS and 8LHS are signal control relays corresponding to those designated RHS and LHS in the Lewis patent, which may be selectively energized by manual control from the office to effect the clearing of the entering signal 2RA or 8LA in accordance with traffic conditions, provided the track switches 1W and 7W occupy their normal positions, as shown.

It will be understood that in practice, additional apparatus is provided for effecting the clearing of signals 2RB or 8LB by the operation of relay 2RHS or 8LHS when the associated track switch 1W or 3W is reversed, and also for the control of the leaving signals 2LA, 2LB, 8RA and 8RB and of the track switches 1W and 7W, together with apparatus at the office for indicating the condition of these switches and signals as shown in the Lewis patent.

The communication system also includes an indication channel for the control of a block indication relay at the office, such as relay 2RBK, which relay is released only when the line relay 2RHD is energized in its normal direction. Relay 8LHD similarly governs the block indication relay 8LBK, and a block indicator lamp BKE is lighted to indicate block occupancy when both relays 2RBK and 8LBK are energized.

The signals, as shown, are of the conventional color light type. The entering signals are interlocked in the usual manner by approach locking stick relays 2RAS and 8LAS, and time element relays 2TER and 8TER associated with the approach locking relays provide the usual time locking to delay the reversal of traffic movement for a predetermined time following the manual restoration of either entering signal to stop.

Each of the outlying track switches 3W and 5W is equipped with an electric switch lock of the type described in detail in my Letters Patent of the United States, No. 2,420,579, issued May 13, 1947, for Railway Traffic Controlling Apparatus, which functions generally in the manner described in that patent. Each electric switch lock is arranged so that it can be unlocked only with the cooperation of the central office operator as manifested by the energization, by current of reverse polarity, of a polarized switch control relay 3WLR or 5WLR at the switch location. Normally these relays are maintained energized by current of normal polarity supplied over line wires 35 and 36 which extend from the remote control system station at one end of the block through the location of switch 3W to the location of switch 5W, and the polarity of the current supplied thereto is reversed by energizing a code controlled relay WLS by the operation of a switch lock lever SL at the control office.

The hand throw switches are provided with normally energized indication relays 3NWP and 5NWP, each of which is energized only when the associated switch is locked in its normal position to permit the passage of main line traffic. These indication relays have front contacts in the cascade connected line circuits which serve to prevent the clearing of a signal governing traffic movements over the hand throw switch except when its indication relay is energized. These relays also govern a repeating relay WLP over the circuit including line wires 35 and 36, and relay WLP governs an indication relay WK controlling a lamp WE at the office in such manner that lamp WE is lighted whenever either switch 3W or 5W is unlocked or displaced from its normal position.

The apparatus for the control of each hand throw switch also includes two line relays such as the relays 3EAR and 3WAR, which may be energized over the line circuits extending in opposite directions from the switch to enable the switch to be unlocked for a train on the side track at times when the block is not occupied by an approaching train.

The operation of the apparatus of my invention will now be described under different assumed conditions.

It will first be assumed that signal 2RA is to be cleared, the block being unoccupied with the track switches in their normal positions as shown. Under this condition, all of the line relays RHD and LHD and their repeating relays RHP and LHP and the approach locking relays 2RAS and 8LAS are energized, relays 2RHD and 8LHD being energized in the normal direction as shown with their polar contacts in the left-hand position.

More particularly, relay 6RHD is energized in the reverse direction over a line circuit including back contacts of relays 6Z and 8Z and front contacts of the track relays 6RTR, 8TR and 7TR, which extends to terminal B at front contact $c$ of relay 8LAS and to terminal C at a back contact of relay 8RAPC. Relay 6RHD energizes relay 6RHP, which energizes relay 4RHD in the normal direction over the circuit which includes the line wires 33 and 34, a back contact $b$ of relay 5WAR, front contacts of the switch indication relay 5NWP and of the track relays 4RTR, 5TR and 6LTR, and extends to terminal B at a front contact of relay 6RHP, and to terminal C at a back contact of relay 6RS. Relay 4RHD energizes relay 4RHP, which energizes relay 2RHD in the normal direction in series with relay 4AR over the circuit which includes the line wires 23 and 24, a back contact $c$ of relay WLS bridged by the normal contact $a$ of relay 2RHD, front contacts of relay 3NWP and of the track relays 1TR, 2TR, 3TR and 4LTR, and extends to terminal B over front contact *b* of relay 4RHP, a normal contact of relay 4RHD and the winding of relay 4AR, and to terminal C over front contact *d* of relay 4RHP and a normal contact of relay 4RHD. Relay 2RHP is energized by relay 2RHD, and relay 2RAS is energized over a stick circuit which extends to terminal C over its own front contact and windings, and to terminal B over back contacts of relays 2RAH and 2RHS.

The circuits for the relays LHD and LHP, and for relays 6AR and 8LAS are similar to those just traced, as may be seen from the drawings.

Under the conditions shown, lamps R of signals 2RA and 8LA are lighted, also lamps Y of signals 6R and 4L, and lamps G of signals 4R and 6L.

The operator moves the signal lever 2SG to the right, thereby energizing the signal control relay 2RHS.

Since relay 2RHP is picked up, the opening of back contact *c* of relay 2RHS releases relay 2RAS, which by opening its contact *c* disconnects terminal B from the line circuit system for the opposing signals, releasing all of the relays LHD and LHP.

The release of relay 4LHP extinguishes lamp Y and lights lamp R of signal 4L, and the release of relay 6LHP extinguishes lamp G and lights lamp R of signal 6L. Lamp R of signal 8LA is lighted over back contact *a* of the signal relay 8LAH. All of the signals governing traffic movements from right to left therefore indicate stop.

The signal relay 2RAH becomes energized over front contacts *c* of relays 2RHS and 2RHP and back contact *d* of relay 2RAS, a contact N closed by switch 1W when locked in its normal position, and a front contact *c* of the track relay 1TR.

Relay 2RAH picks up and lights lamp G of signal 2RA over front contact *a* of relay 2RAH and the normal contact *c* of relay 2RHD to cause signal 2RA to indicate proceed. Signal 4R now indicates proceed and signal 6R indicates caution, and if the operator now clears the leaving signal 8RA, the circuits for which are not shown herein, relay 8RAPC will pick up and will operate relay 6RHD from reverse to normal to extinguish lamp Y and light lamp G of signal 6R so that this signal will also indicate proceed.

The release of relay 8LHD which results from the operation of relay 2RHS as above described causes the block indication relay 8LBK to become energized over wire 38, thereby closing one of the two contacts in the circuit for lamp BKE. Relay 8LHD deenergizes relay 8LHP which by closing its back contact *c* prevents the release of relay 8LAS and thereby prevents the opening of the line circuits for the energized signals by that relay in the event the operator should inadvertently operate the signal control relay 8LHS.

Assuming now that signals 2RA, 4R, and 6R have been cleared as above described and that a train governed by signal 2RA enters section 1T. Relay 1TR releases, thereby releasing relays 2RHD, 2RHP, 4AR and 2RAH, restoring signal 2RA to stop. Relay 2RHS is released automatically as explained in Patent No. 2,229,249, or manually upon the return of lever 2SG to its normal position. The release of relays 1TR and 2RHP or 2RHS completes a circuit for reenergizing relay 2RAS which picks up to reestablish its stick circuit. The release of relay 2RHD causes the block indication relay 2RBK to become energized and lamp BKE is lighted thereby to indicate the occupied block condition.

The line circuit system for the opposing signals, or more particularly the circuit for relay 4LHD, which was opened by the release of relay 2RAS, is held open by relay 1TR after relay 2RAS becomes reenergized. As the train advances through sections 2T, 3T and 4LT, the circuits for relays 2RHD and 4LHD are maintained open by the release of the track relays 2TR, 3TR and 4LTR.

When the train passes signal 4R and drops the track relay 4RTR, relays 4RHD and 4RHP release, restoring signal 4R to stop and energizing the directional stick relay 4RS in the conventional manner to supply current of reverse polarity over its front contacts *b* and *d* to the line circuit including line wires 23 and 24, for the section in the rear, so that relay 2RHD picks up and energizes relay 2RHP as soon as section 4LT is vacated, but relay 2RHD is now energized in the reverse direction so that relay 2RBK remains energized and lamp BKE continnes to be lighted. Relay 4AR picks up in series with relay 2RHD but this has no effect at this time because the circuit for relay 4Z which relay 4AR controls is now open at front contact *a* of relay 4RHD. Relays 4LHD and 4LHP pick up and lamp Y of signal 4L becames lighted in place of lamp R when section 4LT is vacated because the line circuit including the line wires 21 and 22 for the right to left traffic direction is supplied with current over contact *c* of relay 2RAS, provided relay 2RHS is not reoperated.

Relay 4LHP now connects terminal B to the circuit for relay 6LHD, but while the train is passing through sections 4RT, 5T and 6LT, this circuit, and also the circuit for relay 4RHD, is held open by the release of the track relays 4RTR, 5TR and 6LTR.

When the train passes signal 6R, relay 6RTR releases so that relays 6RHD and 6RHP release, lamp R of signal 6R is lighted in place of lamp Y or G and relay 6RS picks up, and then when section 6LT is vacated, relay 6LTR picks up so that relay 4RHD becomes energized in the reverse direction over line wires 33 and 34, and relay 4RHP picks up, lighting lamp Y of signal 4R in place of lamp R, releasing relay 4RS and transferring the circuit for relay 2RHD to the reverse polar contacts of relay 4RHD so that relay 2RHD is maintained energized in the reverse direction. Concurrently, relay 6LHD is energized over line wires 31 and 32 in the normal direction by relay 4LHP, and relay 6LHP picks up to light lamp G of signal 6L, in place of lamp R.

Relay 6LHP now connects terminals B and C to the circuit for relays 6AR and 8LHD, but while the train is passing through sections 6RT, 8T and 7T, this circuit, and also the circuit for relay 6RHD, is held open by the release of the track relays 6RTR, 8TR and 7TR.

When the train vacates the last section 7T of the block, relay 7TR picks up and relays 6RHD and 6RHP become energized to light lamp Y of signal 6R in place of lamp R, to release relay 6RS, and to supply current of normal polarity to relay 4RHD, which shifts its polar contacts to their normal position to light lamp G of signal 4R in place of lamp Y and to operate relay 2RHD to its normal position, whereupon relay 2RBK is released. Concurrently, relay 8LHD is picked up in the normal direction by relay 6LHP and releases relay 8LBK. Lamp BKE is extinguished by the release of relay 2RBK or 8LBK whichever occurs first.

It will now be assumed that the operator reenergizes relay 2RHS for the purpose of clearing signal 2RA for a following train when the train referred to in the preceding description is occupying the section in advance of signal 6R, at which time relay 4RHD is energized reverse causing signal 4R to indicate caution, and relay 2RHD is energized reverse over the reverse polar contacts of 4RHD as provided in accordance with the present invention to hold relay 2RBK picked up, thereby maintaining the indication of block occupancy even though signal 2RA indicates proceed. This operation of relay 2RHS releases successively the relays 2RAS, 4LHD, 4LHP, 6LHD and 6LHP, and energizes relay 2RAH, the latter relay completing a circuit at its front contact *a* over the reverse contact *c* of relay 2RHD and back contact *a* of relay 2RD for lamp Y of signal 2RA. Since relay 2RHD is now energized reverse, the closing of front contact *c* of relay 2RHS completes the circuit over front contact *c* of relay 2RHP and the reverse contact *b* of relay 2RHD for relay 2Z, which picks up and connects relay 2RD to the left-hand end of the line circuit for relay 4LHD which includes the line wires 21 and 22, the latter relay having been deenergized by the release of relay 2RAS. Since relay 4RHD is now energized reverse and relay 4AR is energized in series with relay 2RHD, the release of relay 4LHD completes a circuit for relay 4Z extending from terminal B at contact *a* of relay 4RHD over the reverse contact *b* of that relay, contact *c* of relay 4LS, contact *a* of relay 4AR, and back contact *d* of relay 4LHD through relay 4Z to terminal C. Relay 4Z therefore picks up and completes an energizing circuit for relay 2RD by connecting terminals B and C to the right-hand end of the line circuit for relay 4LHD in place of that relay. Relay 2RD then picks up, the operation of its contact *a* extinguishing lamp Y and lighting lamp G of signal 2RA. Relay 2RA is thus caused to indicate proceed in accordance with this feature of my invention, without the operation of relay 2RHD to its normal position as required in the conventional system under similar conditions.

Assuming now that the first train referred to in the foregoing as occupying section 6RT now vacates the block, it will be obvious that the polar contacts of the relays 4RHD and 2RHD will be operated to their normal positions and relays 2Z, 4Z, and 2RD will release, restoring the system to a condition already described, with lamp G of signal 2RA energized over the left-hand contact *c* of relay 2RHD, and with relays 2RBK and 8LBK released.

Since the line circuit system is symmetrical, the operations involving right to left traffic movements are similar to those described, that is, relay 8LHD is controlled like relay 2RHD, its circuit including polar contacts of relay 6LHD. Relays 6Z, 8Z, and 4LD are governed by relay 4LHS like the corresponding relays for the left to right direction, and consequently, a detailed description of the operation of these relays is deemed unnecessary.

The mode of operation of the electric switch lock control system will now be described, assuming first that the release of the lock for switch 3W is desired in order to enable a train occupying the side track at that switch to enter the block. To authorize this movement, the operator will reverse the switch lock lever SW in order to energize relay WLS.

In practice lever SW is preferably interlocked with the signal levers and indication means as described in my Patent No. 2,420,579, so that relay WLS is operable only when the entering signals are at stop, and the signal control relays 2RHS and 8LHS are deenergized. Assuming that conditions permit relay WLS to become energized, its contacts *a* and *b* reverse the polarity of the current supplied to line wires 35 and 36 over which the control relays 3WLR and 5WLR are normally energized, so that these relays close their reverse polar contacts.

The switch lock mechanism is provided with a padlock having a bail 50, as explained in my Patent No. 2,420,579, hereinbefore referred to. The removal of the padlock from the lock for switch 3W by the train crew allows a preliminary movement of the lock lever to be effected to a position where segment 25 engages the locking dog 27, and the contacts 46—47 and 51—52 are closed. The closing of contact 51—52 connects a line relay 3EAR cross the line circuit for relay 2RHD over contacts *a* and *c* of relay 3WLR, and relay 3EAR becomes energized by the current which is supplied to this circuit over line wires 23 and 24 and the front contacts *b* and *d* of relay 4RHP. The closing of front contact *b* of relay 3EAR connects relay 3WAR across the line circuit for relay 4LHD which under the condition assumed is supplied with current over contact *c* of relay 2RAS. Relays 4LHD, 4LHP, 6LHD, 6LHP and 8LHD now release, and relay 8LBK picks up. Relay 3WAR picks up, the closing of its front contact *a* completing a circuit for the lock magnet 3WL from terminal B at contact *b* of relay 3WLR over the reverse contact *d* of that relay, front contacts *a* of relays 3WAR and 3EAR and contacts 47—46, and magnet 3WL assumes its energized position, opening its back contact 48 and lifting the locking dog 27 so as to permit segment 25 to be moved to its full reverse position to unlock the switch, thereby opening contact 49. The opening of contact 48 releases relay 3NWP, which opens its front contacts *a*, *b*, *c*, *d*, *e*, and *f*, to disconnect relays 4LHD and 2RHD from their respective line circuits, and to deenergize relays 5WLR and WLP. Relays 2RHD and 2RHP now release, and relay 2RBK picks up to light lamp BKE. Relay 3NWP also closes a local circuit over its back contacts *e* and *f* by which relay 3WLR is held energized in the reverse direction. The release of relay 5WLR prevents the unlocking of switch 5W, and the release of relay WLP indicates the unlocking of switch 3W by energizing the indication relay WK at the office to light lamp WE.

After the switching operation has been completed and switch 3W has been restored to normal and locked in that position by the train crew, as manifested by lamp WE becoming dark as a result of the reenergization of relays 3NWP and WLP, the operator restores lever SW to normal to release relay WLS and to restore relays 3WLR and 5WLR to their normal positions as shown.

Switch lock 3WL may also be energized as above described when the block is occupied by a train moving from left to right which has passed signal 4R, in which case relay 3EAR may be energized over the front contacts *b* and *d* of relay 4RS.

Switch 5W may be unlocked under corresponding conditions by the operation of the similar apparatus associated therewith, and shown in Fig. 1B, either when the block is vacant or when it is occupied by a receding train which has vacated the block section containing the switch.

It will be noted however that the energization of relay 3EAR or release of relay 3NWP opens the circuits for relay 5WAR and 5WLR and so prevents the unlocking of switch 5W, and that the energization of relay 5WAR or release of relay 5NWP opens the circuits for relays 3EAR and 3WLR and so prevents the unlocking of switch 3W.

Switch 3W or 5W may also be unlocked to permit a main line train to enter the side track if the operator energizes relay WLS when the train occupies a short releasing section 3T or 5T adjacent the switch, in which case the circuit for the lock magnet is completed over a back contact *e* of the track relay 3TR or 5TR.

A further condition to be considered is that existing when a train moving from left to right has passed signal 6R, if signal 2RA has been cleared for a following train by the operation of relays 2Z, 4Z, and 2RD as hereinbefore described, and the operator then restores signal 2RA manually to stop in order to admit a train to the block via switch 5W ahead of the train approaching signal 2RA.

The operator releases relay 2RHS, which energizes a time element relay 2TER, releases relays 2RAH, 2Z and 2RD, lights lamp R of signal 2RA in place of lamp G, and after a time interval imposed by relay 2TER, energizes relay 2RAS. He also energizes relay WLS, contact *c* of which opens the line circuit for relay 2RHD since this relay is reversed, and its contact *a* in parallel with contact *c* of relay WLS is open. This releases relays 2RHD and 4AR, and the opening of contact *a* of relay 4AR releases relay 4Z, which enables relays 4LHD, 4LHP, and 5WAR to become energized as required to unlock switch 5W.

It will be seen, therefore, that the control of the outlying track switch is not interfered with by the special circuits provided in accordance with the invention for the control of the block indication.

A similar condition exists when a train moving from right to left has passed signal 4L, if signal 8LA has been cleared for a following train by the operation of relays 6Z, 8Z, and 8LD, and the operator then restores signal 8LA manually to stop to enable switch 5W to be unlocked. In this case relays 6LHD and 8LHD are energized in the reverse direction and relay 8LAS is released. The polar contact *a* of relay 8LHD and front contact *b* of relay 8LAS are both open and the line circuit for relay 8LHD is opened at contact *e* of relay 8LHS when the operator releases that relay, thereby releasing relays 8LHD and 6AR, and relay 6AR in turn releases relay 6Z. At the same time, relay 8Z is released by the opening of front contact *c* of relay 8LHS, permitting the energization of relays 6RHD, 6RHP, and 5EAR in response to the closing of contact *c* of relay 8LAS as required for the unlocking of switch 5W.

It will be seen from the foregoing that the apparatus of my invention operates in such a manner that when the block is vacant, this is properly indicated due to the fact that at least one of the line relays 2RHD and 8LHD is energized in the normal direction, although the other may be released, due to the clearing of the opposing entering signal. Both these relays are released when an outlying track switch is unlocked, and when the block is occupied, at least one of these relays is released, the other being either released or energized reverse, and this condition is also properly indicated by the control of lamp BKE over contacts of the two indication relays in series, as shown.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In a centralized traffic control system for a stretch of single track railroad divided into three or more block sections and having entering signals at the ends and intermediate signals at the junctions of said sections for governing traffic movements through the stretch in two directions, a polar neutral line relay for each signal, two systems of normally energized line circuits including one for each direction for controlling the line relays for the signals for the corresponding direction in cascade, each system of circuits being so arranged that the line relay for each signal is energized by current of normal or reverse polarity only when the block section directly in advance of such signal is unoccupied, means goverened by each line relay for an intermediate signal for supplying current of reverse polarity to the circuit for the line relay for the next signal in the rear for the same direction when any section of said stretch in advance of such intermediate signal is occupied by a train moving in the corresponding direction and for supplying current of normal polarity to said circuit only when all of such advance sections are unoccupied, means for causing each signal to indicate caution when the line relay therefor is energized by current of reverse polarity and to indicate proceed when such relay is energized by current of normal polarity, an auxiliary relay for each entering signal having an energizing circuit which is closed only when the next signal in advance of such entering signal for the same direction indicates caution, each auxiliary relay being effective when energized to change the indication of the associated entering signal from caution to proceed, a block indicator at a control office, and means controlled by the line relays for the entering signals and effective only when the line relay for at least one entering signal is energized by current of normal polarity for causing said block indicator to indicate the unoccupied condition of said block.

2. In a centralized traffic control system for a stretch of single track railroad divided into three or more block sections and having entering signals at the ends and intermediate signals at the junctions of said sections for governing traffic movements through the stretch in two directions, a polar neutral line relay for each signal, two systems of normally energized cascade connected line circuits including one for each direction for energizing each line relay for a signal for the corresponding direction by current of normal or reverse polarity when the block section directly in advance of such signal is unoccupied, means for supplying current of normal or reverse polarity to each such system of circuits at its exit end only when the entering signal for the opposite direction stands at stop, means governed by each line relay for an intermediate signal for supplying current of reverse polarity to the circuit for the line relay for the next signal in the rear for the same direction when any section of said stretch in advance of such intermediate signal is occupied by a train moving in the corresponding direction and for supplying current of normal polarity thereto only when all of such advance sections are unoccupied, means for causing each signal to indicate caution when the line relay therefor is energized by current of reverse polarity and to indicate proceed when such relay is energized by current of normal polarity, an auxiliary relay for each entering signal, line circuit means for energizing each auxiliary relay only when the next signal in advance of such entering signal for the same direction indicates caution, each auxiliary relay when energized being effective to change the indication of the associated entering signal from caution to proceed, a block indicator at a control office, and means controlled by the line relays for the entering signals for causing said indicator to indicate the occupancy of said stretch unless the line relay for at least one of the entering signals is energized by current of normal polarity.

3. In a centralized traffic control system for a stretch of single track railroad divided into at least three block sections and having an entering signal at each end, track circuits for said sections having normally energized track relays, a normally energized polar neutral line relay for each entering signal, line circuit means for energizing each such line relay by current of normal polarity only when all of said track relays are picked up, directional stick relay means at the junctions of said sections for energizing each such line relay by current of reverse polarity when the first block section in advance of the corresponding signal has been vacated by a train which is occupying another section of said stretch in advance of said first block section, a control relay for each entering signal remotely controlled from a central office, an auxiliary relay for each entering signal, mean controlled by each control relay when operated to open the circuit for the line relay for the signal at the opposite end of the stretch and to then condition the signal at the adjacent end to indicate proceed if the line relay therefor is energized by current of normal polarity and to condition said signal to indicate proceed or caution, depending upon whether or not the associated auxiliary relay is energized, when such line relay is energized by current of reverse polarity, an energizing circuit for each auxiliary relay governed by the associated control relay, said circuit including a portion at least of the line circuit for the opposing line relay, and so arranged that the auxiliary relay is energized to condition the adjacent signal to indicate proceed when the two block sections directly in advance thereof are vacant and the polar neutral line relay for such signal is energized by current of reverse polarity due to the occupancy of a more remote section in said stretch, and a block indicator at said office controlled jointly by said line relays and arranged to indicate the unoccupied condition of the block when either polar neutral line relay is energized by current of normal polarity.

HENRY S. YOUNG.

REFERENCES CITED

The following references are of record in the file of this patent:

UNITED STATES PATENTS

| Number | Name | Date |
|---|---|---|
| 2,154,539 | Stoker | Apr. 18, 1939 |
| 2,326,991 | Young | Aug. 17, 1943 |
| 2,328,657 | Lay | Sept. 7, 1943 |